United States Patent [19]
Becker et al.

[11] 3,920,176
[45] Nov. 18, 1975

[54] SOLDER METHOD

[75] Inventors: John E. Becker; Adolph E. Schultz, both of Evansville, Ind.

[73] Assignee: Whirlpool Corporation, Benton Harbor, Mich.

[22] Filed: Sept. 9, 1974

[21] Appl. No.: 504,430

[52] U.S. Cl. ............... 228/183; 228/257; 228/262
[51] Int. Cl.² ........................ B23K 1/08; B23K 1/06
[58] Field of Search . 29/157.3 R, 157.3 B, 157.3 C, 29/157.6, 471.1, 503; 118/56; 117/114 R

[56] References Cited
UNITED STATES PATENTS

| | | | |
|---|---|---|---|
| 2,417,472 | 3/1947 | Dorff | 118/56 UX |
| 2,417,662 | 3/1947 | Rosales | 29/503 X |
| 2,925,063 | 2/1960 | Mondry | 118/500 |
| 3,341,353 | 9/1967 | Johnson | 117/94 |
| 3,750,248 | 8/1973 | Morris | 29/157.3 R |
| 3,752,381 | 8/1973 | Watson, Jr. | 228/36 X |
| 3,760,481 | 9/1973 | Greever | 29/157.3 R |
| 3,833,986 | 9/1974 | DeCicco | 29/157.3 A |

*Primary Examiner*—James L. Jones, Jr.
*Assistant Examiner*—K. J. Ramsey
*Attorney, Agent, or Firm*—Wegner, Stellman, McCord, Wiles & Wood

[57] ABSTRACT

A method of soldering a metal tubular element having an arcuate portion and an end portion to a metal female element receiving the end portion and defining a distal annular solder space. The elements are mechanically secured together and immersed in a solder bath with the solder space opening downwardly and with the arcuate portion of the tubular element lowermost. The elements may be preheated for improved solder coating thereof in the bath. The solder coated elements are withdrawn from the bath and immediately inverted to allow the melted solder thereon to run toward the end portion and into the solder space to prevent formation of icicles on the arcuate portion and provide an improved soldered connection to the female element.

16 Claims, 8 Drawing Figures

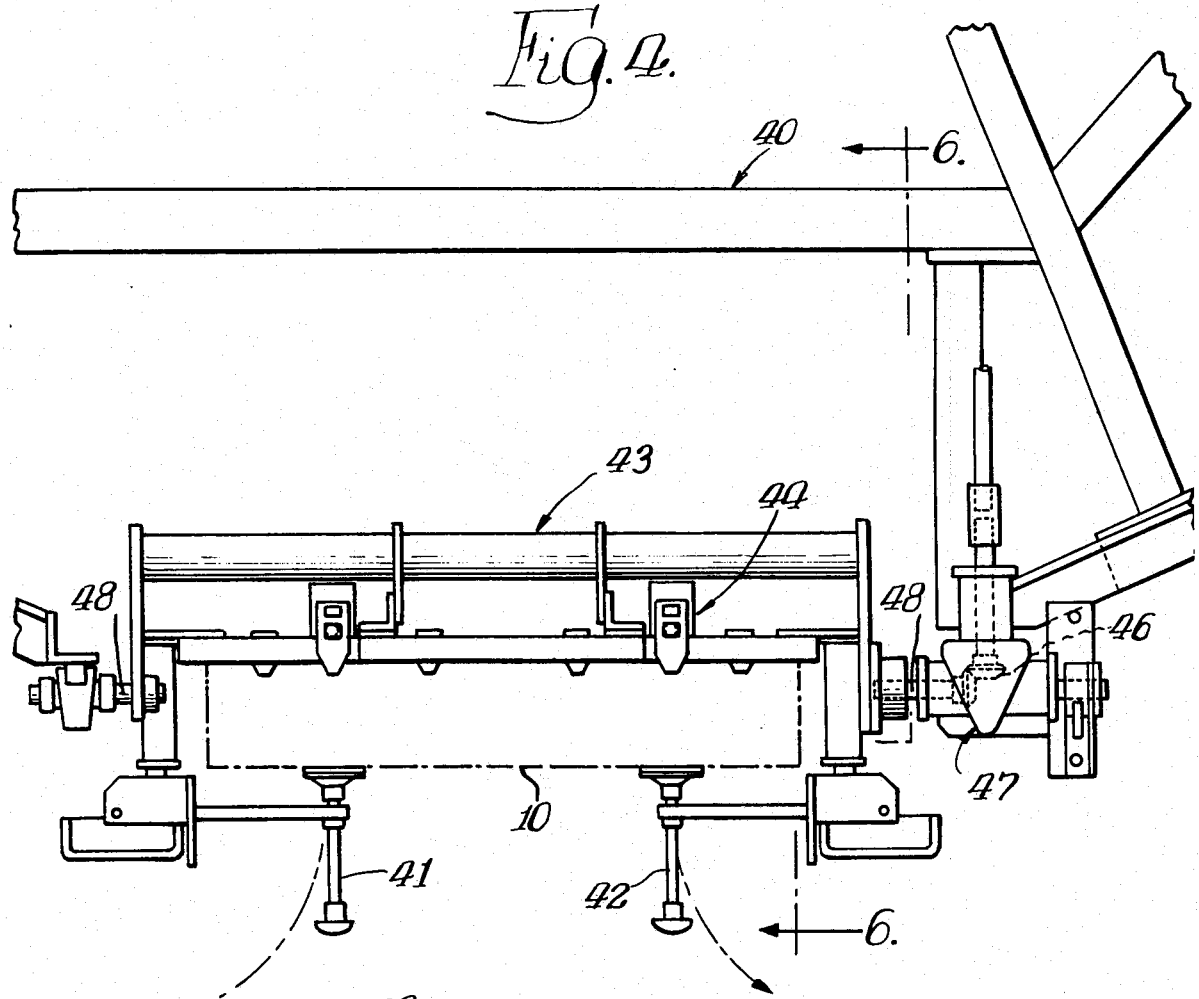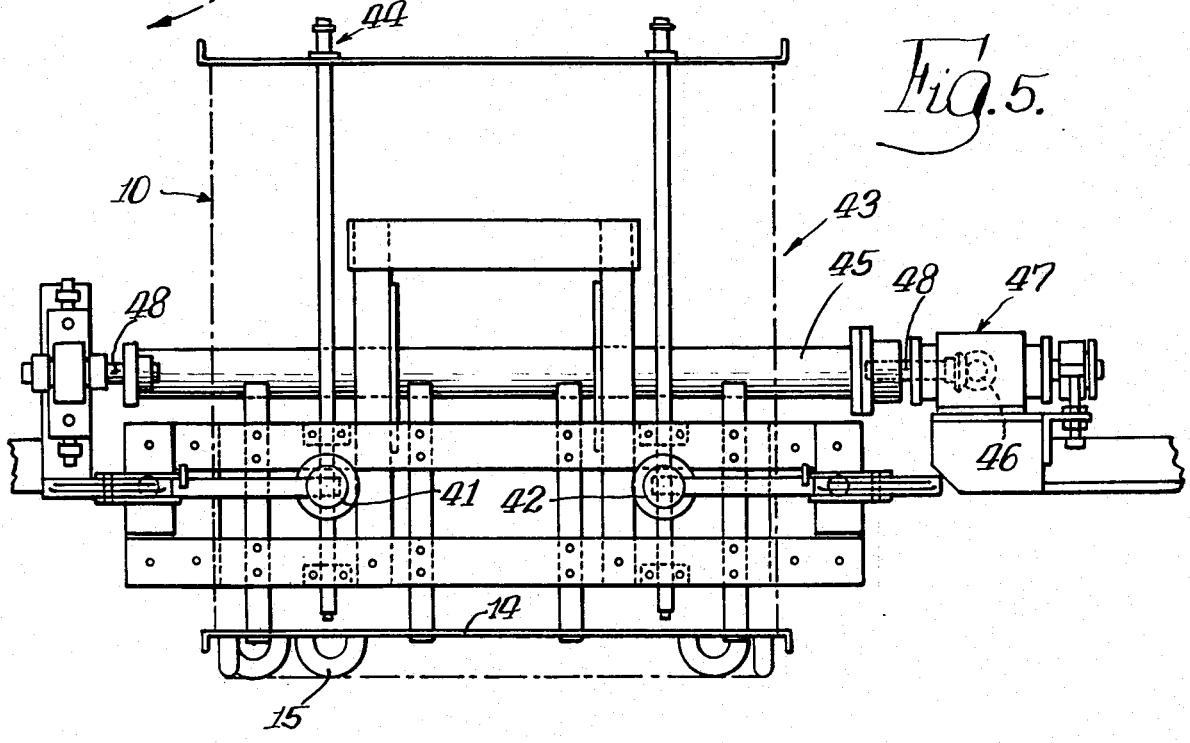

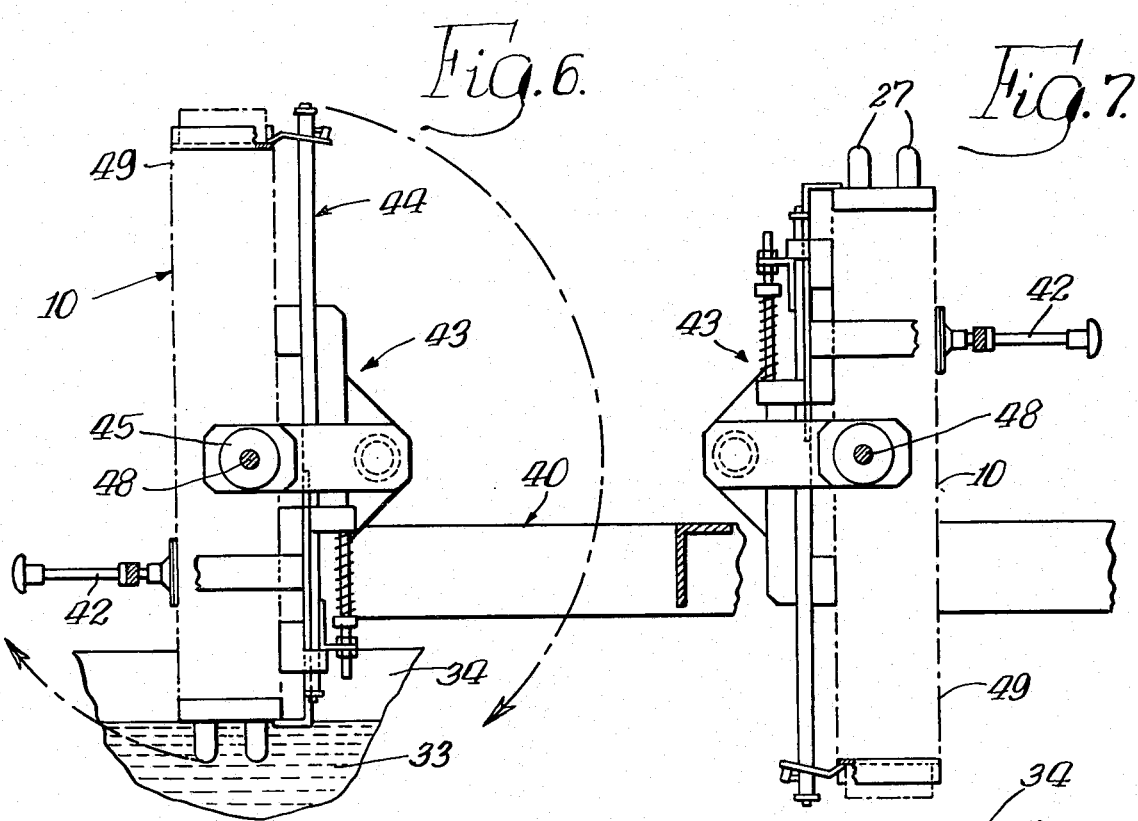
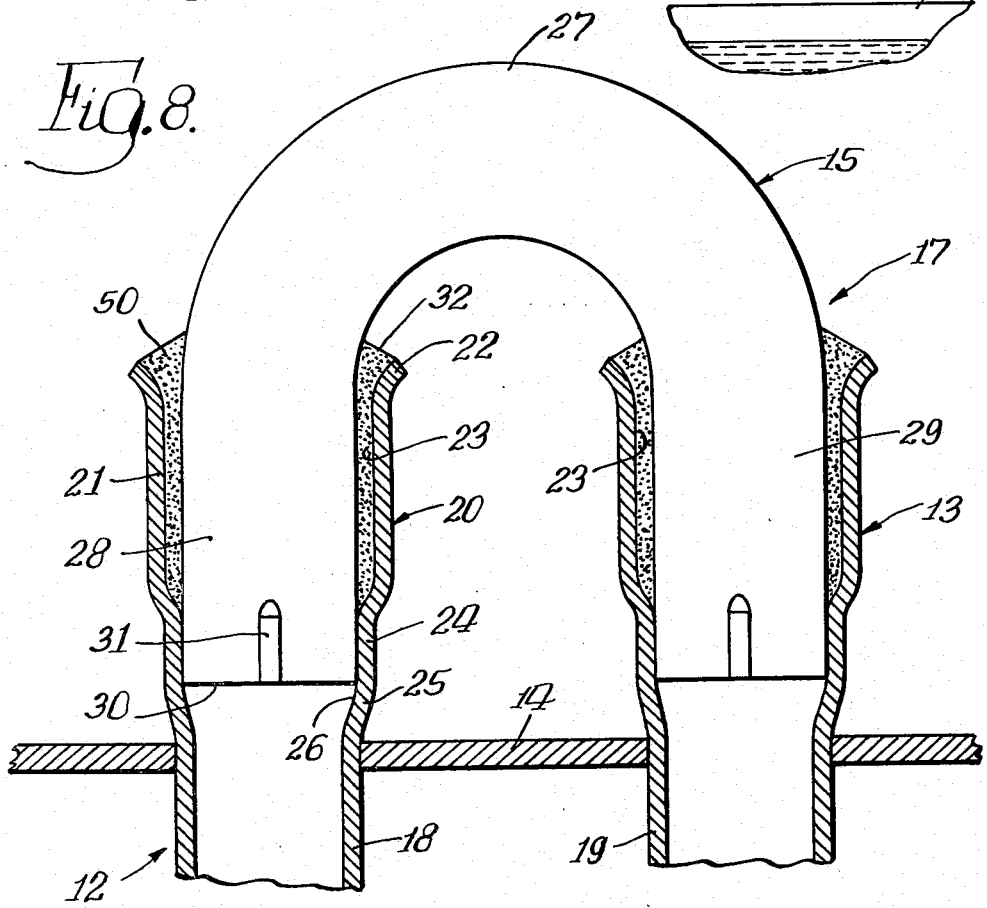

SOLDER METHOD

BACKGROUND OF THE INVENTION

1. Field of the Invention

This invention relates to soldering methods and in particular to soldering of tubular elements such as metal heat exchanger elements.

2. Description of the Prior Art

In one conventional form of heat exchanger, such as used in an air conditioner or other refrigeration apparatus, a tube and fin structure is provided having a serpentine fluid conducting tube and transversely extending fins. The serpentine tube is formed by sealingly connecting a return bend to the distal end of hairpin tubular elements. One example of such a structure is illustrated in U.S. Pat. No. 3,750,248 of Herbert R. Morris. As shown therein, the hairpins define distal leg portions extending through a header plate in laterally spaced relationship to receive the return bends which may be sealed thereto by a solder joint. The return bends include leg portions inserted into the distal ends of the hairpin legs with the solder joint extending downwardly into the space therebetween.

One method of forming such a solder joint between aluminum components is to dip the heat exchanger assembly into an ultrasonically energized solder bath, remove the solder coated assembly from the bath and allow it to cool as illustrated in James E. Greever U.S. Pat. No. 3,760,481. A problem arises, however, in this method in that icicles or relatively sharp projections are formed on the return bends from the flow of the molten solder downwardly therealong during the setting of the solder. Such icicles are relatively sharp and must be removed to permit subsequent manipulation of the heat exchanger in further manufacturing operations.

Another problem arises in this conventional method of dip soldering of aluminum heat exchangers in that the solder does not always completely fill the solder space or shrinkage voids or shrinkage cracks associated with cooling of molten solder form so that water and other undesirable material may collect therein and potentially cause failure of the sealed connection as by a freeze-thaw action or corrosion.

One attempted solution to this problem is illustrated in the above-identified Morris patent. Morris attempts to solve this problem by providing a ring of solder about the upwardly opening flared end of the female element and subsequently heating the solder by radiation heating, electrical resistance heating, controlled application of a torch or induction heating means. This method, as pointed out by the patentee, raises a problem of flux residue which requires a subsequent circulation of a washing fluid through the connected tube structure. In certain cases, an ammonia solution must be utilized for this purpose.

It has further been conventional to coat workpieces by a process involving the inversion of the workpiece subsequent to the application of the coating material. This concept is illustrated in U.S. Pat. No. 1,978,121 of John Winkler relating to the enamel coating of washing machine tubs. In U.S. Pat. No. 2,417,472 of Russell F. Dorff, a dipping machine is disclosed wherein pottery, chinaware and other ceramic articles are coated with a liquid glaze or similar fluent material for forming teapots, bowls and the like. The work to be coated is clamped to a tray carried on a revolvable shaft.

In George H. Truran U.S. Pat. No. 2,765,761, an apparatus is disclosed for removing soldering flux from radiator cores which effects a tilting of the radiator core subsequent to the movement thereof from the tank.

In U.S. Pat. No. 2,925,063 of John Mondry, a device is provided for manually inverting an article which has been coated by dipping thereof into a tank of plastic solution.

In John R. Johnson U.S. Pat. Nos. 3,146,873 and 3,341,353, a detearing apparatus is disclosed for evening the distribution of liquid coating on an article such as a glass container. The detearing action is effected by a simultaneous plural rotational movement of the coated article for causing the coating to be distributed smoothly thereon under the combined influence of surface tension and gravitational forces.

In Edward D. Kozelnicky U.S. Pat. No. 3,553,824, a printed circuit board is immersed in a solder bath and the icicle formations are reduced in size by coating the inverted circuit board with a flux and reheating the fluxed solder surface sufficient to melt any icicles.

SUMMARY OF THE INVENTION

The present invention comprehends an improved method of dip soldering tubular elements eliminating the formation of icicles and the like and concurrently providing an improved soldered connection. More specifically, the invention comprehends providing a dip soldered connection between a metal tubular element having an arcuate portion and leg portions and a pair of female elements. In the illustrated embodiment, the soldering method is applied to the forming of a fin and tube heat exchanger with the tubular element comprising a return bend and the female elements defining hairpin socket portions thereof.

The return bends are firstly mechanically secured to the hairpin portions by wedging the distal ends of the return bend legs into the distal ends of the hairpin elements. The hairpin ends are flared to define an annular solder space coaxially about the return bend legs. The distal end of the return bend legs may be provided with lugs for facilitating the mechanical connection and the hairpin end portions may define annular gripping portions into which the distal ends of the return bends are snugly fitted.

The distal ends of the hairpin portions may further define annular stop portions for limiting the insertion of the return bend legs thereinto.

The invention further comprehends effecting the soldered connection by an automatic process wherein the mechanically assembled heat exchanger is mounted to a carrier and successively passed through suitable preheating zones to above an ultrasonic solder pot. The heat exchanger is then lowered so as to immerse the return bend elements and distal end portions of the hairpins into the molten solder. Upon the coating of the elements with the solder, the heat exchanger is moved upwardly from the solder and concurrently inverted so as to synergistically prevent formation of icicles or tears and cause the coating molten solder to run into the solder space thereby effectively eliminating voids and providing an improved positive solder joint between the return bends and hairpin elements. The inverted elements are moved laterally to above the solder pot to cooling zones to effect setting of the solder in this improved manner.

Thus, the invention comprehends an improved method of forming improved heat exchangers eliminating disadvantages of prior art methods while providing an improved positive solder joint.

BRIEF DESCRIPTION OF THE DRAWING

Other features and advantages of the invention will be apparent from the following description taken in connection with the accompanying drawing wherein:

FIG. 4 is a fragmentary top plan view of one heat exchanger holding station of the apparatus;

FIG. 5 is a front elevation of the portion of the apparatus illustrated in FIG. 4;

FIG. 6 is a fragmentary vertical section taken substantially along the lines 6—6 of FIG. 4 and illustrating the immersing of the return bends in the solder bath;

FIG. 7 is a section similar to that of FIG. 6 but with the heat exchanger disposed in the inverted position subsequent to the solder dipping operation; and FIG. 8 is a fragmentary enlarged diametric section of the soldered tubular elements.

DESCRIPTION OF THE PREFERRED EMBODIMENT

Figure 1:
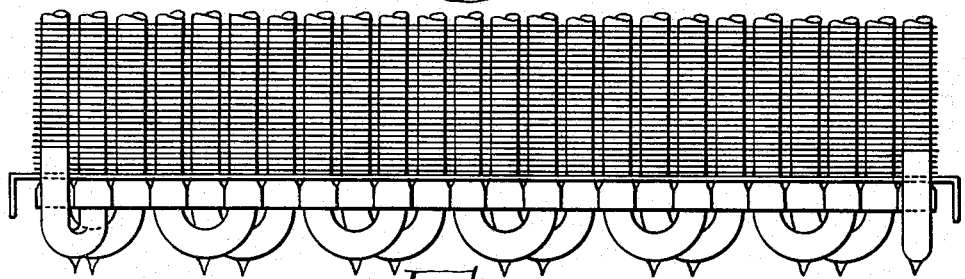
FIG. 1 is a fragmentary side elevation of a heat exchanger having solder joints formed by a dipping operation of the prior art.
Figure 2:
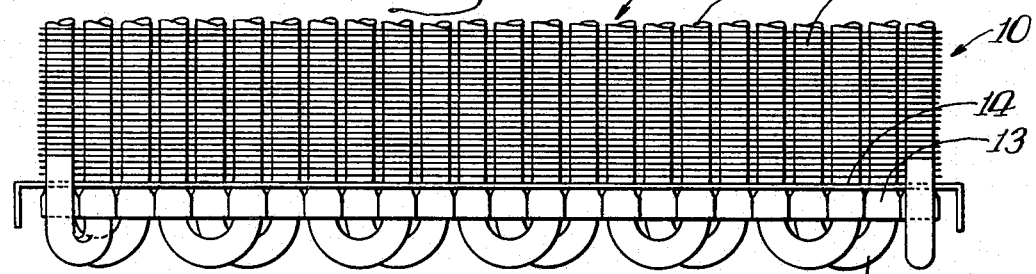
FIG. 2 is a fragmentary side elevation of a heat exchanger having solder joints provided by the improved method of the present invention.

In the exemplary embodiment of the invention as disclosed in the drawing, a heat exchanger generally designated 10 is shown to comprise a tube and fin heat exchanger having a serpentine tube structure 11 defined by plural hairpins 12 having end portions 13 extending through a header plate 14 and defining female socket elements for connection of return bends 15. A plurality of fins 16 extend transversely to the hairpin elements 12 for providing improved heat transfer between the hairpin elements and external fluid such as air flowed thereagainst.

The present invention comprehends an improved method of connecting the return bends 15 to the hairpin ends 13 to provide an improved soldered connection generally designated 17 illustrated in FIG. 8.

More specifically, as shown therein, each hairpin includes leg portions 18 and 19 extending through the header plate 14 and terminating in distal end portions generally designated 20 which include expanded tubular end portions 21 terminating in distal flared ends 22 and defining an annular solder space 23. Inwardly of the portions 21 the hairpin end portions 20 are provided with inner radially reduced end portions 24 having a diameter less than that of portions 21. Portions 24 are joined to the tubular legs 18 by inwardly tapered portions 25 defining an inner, annular tube stop shoulder 26.

Return bends 15 comprise U-shaped tubular elements having an arcuate bight portion 27 and opposite straight portions 28 and 29. The leg portions define distal ends 30 and each is provided with a plurality of lugs 31 adapted to have wedged relationship with the hairpin portions 24 as shown in FIG. 8. Tube stop shoulder 26 serves as a limit to the insertion of the tube end portions 28 and 29 into the hairpin ends 20 by the abutment therewith of the distal ends 30.

As shown in FIG. 8, a body of solder 32 is provided in the solder space 23 providing an improved solder joint sealingly connecting the return bends to the hairpin elements. The present invention is concerned with providing an improved solder joint 17 while concurrently eliminating the formation of tears or icicles on the arcuate return bend portions 27.

Figure 3:
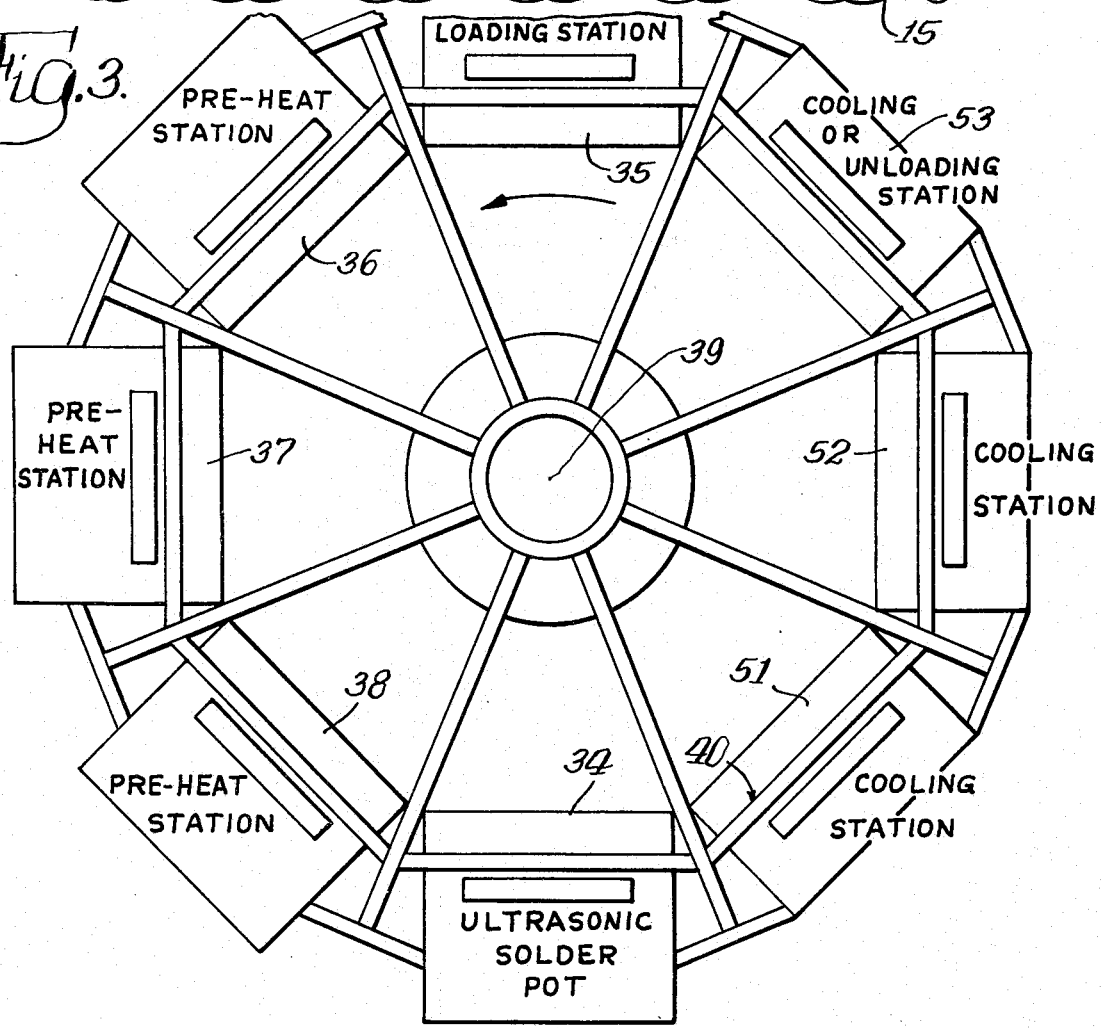
FIG. 3 is a fragmentary top plan view of an apparatus for use in practicing the method of the invention.

More specifically, the invention comprehends the mechanical connection of the aluminum return bends to the aluminum hairpin legs 18 and 19 by the wedging of the return bend legs 28 and 29 into the distal end portions 20 permitting the heat exchanger 10 to be disposed with the assembled return bend and hairpin elements lowermost as shown in FIG. 6. The assembled elements are immersed in a bath 33 of the molten zinc aluminum alloy solder provided in a suitable tank 34 by a lowering thereof into the bath from a position above the tank. The aluminum tubular elements may be assembled by a manual tapping of the return bends into the wedged association illustrated in FIG. 8 and prior to the dipping thereof may be cleaned and degreased by conventional methods such as with perchlorethylene and suitable cleaning chemicals. In the illustrated embodiment, the socket portions 21 of the hairpin elements are immersed with the return bends into the solder bath. One such solder bath is illustrated in James J. Watson U.S. Pat. No. 3,752,381. Ultrasonic vibration of the solder is effected to provide improved solder coating of the elements by breaking up the oxide film on the surface of the aluminum elements to permit the solder coating to adhere thereto. To further assure positive solder coating, the elements may be preheated to the desired soldering temperature by passing thereof through a succession of preheated stations on a suitable conveyor as illustrated in FIG. 3. As shown therein, the hairpins may be mounted to the conveyor at a loading station generally designated 35 and sequentially delivered to preheat stations 36, 37 and 38 prior to the delivery to the solder pot as shown. Illustratively, the conveyor may comprise a table rotatable about an axis 39 by suitable drive means (not shown).

Referring now to FIGS. 4 and 5, the heat exchanger 10 may be removably secured to the conveyor 40 by suitable clamp portions 41 and 42 of a carrier 43 which clamp the heat exchanger against a backup structure 44. The carrier 43 is rotatably about a horizontal axis on a shaft 45 which is driven from a drive shaft 46 through a suitable bevel gear transmission 47. The horizontal axis of rotation 48 of shaft 45 is disposed closer to the return bend portion of heat exchanger 10 than the opposite edge portion 49, as shown in FIGS. 6 and 7, to minimize swinging of the return bend portion in the inversion of the heat exchanger.

As further illustrated in FIGS. 6 and 7, subsequent to the immersing of the elements to be soldered in the solder bath, the heat exchanger is raised from the tank 34 and concurrently rotated about axis 48 so as to dispose the return bends 27 uppermost, as illustrated in FIG. 7. The solder coating on the return bends is substantially fluid at this time so as to tend to run along the arcuate portion 27 downwardly toward the leg portions 28 and 29 and into the solder spaces 23 to fill any voids therein which may be present notwithstanding the immersion of the elements into the solder bath. The temperature of the elements and solder is preselected to assure the desired flow of the solder thereby to avoid the formation of icicles or tears, and synergistically eliminate voids in the filling of the solder space and causing formation of a solder fillet 50 at the outer end of the solder space 23. The provision of fillet 50 effectively avoids the collection of fluids and other material between the elements 12 and 27 so as to assure long trouble-free life of the structure. The inversion of the heat exchanger should be smoothly or evenly performed so that molten solder is not displaced from the joint during the inversion step.

Upon inversion of the heat exchanger, as illustrated in FIG. 7, the structure is moved laterally from above the ultrasonic solder pot 24 sequentially to cooling stations 51 and 52 for setting of the solder to form the solder joint, as illustrated in FIG. 8. The soldered heat exchanger may then be unloaded from the conveyor at a subsequent unloading station 53, completing the soldering operation.

The conveyor may be suitably controlled to provide suitable dwell periods for the heat exchangers at each of the different zones and stations. The effecting of the inversion of the coated joint immediately upon removal from the solder bath assures the desired eliminations of icicles and tears on the return bends while concurrently assuring the elimination of voids in the solder space 23 and the formation of the desired fillets 50. The use of ultrasonic vibration in the dipping operation provides further improved coating of the elements in effecting the solder joint.

By eliminating the need to remove icicles and tears from the solder joints, cost reduction and facilitated manufacture of the heat exchangers is obtained.

The foregoing disclosure of specific embodiments is illustrative of the broad inventive concepts comprehended by the invention.

Having described the invention, the embodiments of the invention in which an exclusive property or privilege is claimed are defined as follows:

1. The method of soldering a metal tubular element having an outer portion and an inner end portion to a metal female element receiving said end portion and defining a distal annular solder space in said female element about said end portion, said method comprising the steps of: coaxially securing said end portion into said female element with said outer portion disposed outwardly thereof; immersing the secured end portion in a molten solder bath with said space opening downwardly to apply a coating of molten solder to said tubular element and into said solder space; withdrawing the molten solder coated tubular element from the bath and, prior to solidifying of said solder on said tubular element inverting the same to dispose said space to open upwardly and allow molten solder on said tubular element to run into and fill voids in said solder space and to form a fillet at the upper end of said solder space; and setting the solder.

2. The method of soldering a tubular element to a female element of claim 1 wherein the distal end of said end portion is wedged into said female element.

3. The method of soldering a tubular element to a female element of claim 1 wherein said elements are preheated prior to the immersion in said bath.

4. The method of soldering a tubular element to a female element of claim 1 wherein said tubular element end portion is pressed into said female element with a force sufficient to prevent separation thereof during the immersion step.

5. The method of soldering a tubular element to a female element of claim 1 wherein the step of inverting comprises a step of swinging the solder coated tubular element about a horizontal axis.

6. The method of soldering a tubular element to a female element of claim 1 wherein the step of inverting comprises a step of swinging the solder coated tubular element about a horizontal axis spaced from said end portion.

7. The method of soldering a tubular element to a female element of claim 1 wherein the molten solder is ultrasonically vibrated while said secured end portion is immersed therein.

8. The method of soldering a tubular element to a female element of claim 1 wherein said end portion is lowered vertically into said solder bath to effect said immersing.

9. The method of soldering a tubular element to a female element of claim 1 wherein said inverted elements are raised to laterally of the space above the solder bath to effect a cooling thereof and solidification of the molten solder.

10. The method of soldering a tubular element to a female element of claim 1 wherein the outer portion of the tubular element is arcuate.

11. The method of soldering a U-shaped metal tubular element having an arcuate bight portion and spaced leg portions to a pair of metal female elements receiving said leg portions, each female element defining a distal annular solder space, said method comprising the steps of: coaxially securing said leg portions into said female elements with said bight portion therebetween; immersing the tubular element in a molten solder bath with said spaces opening downwardly to apply a coating of molten solder to said tubular element and into said solder space; withdrawing the molten solder coated tubular element from the bath and concurrently inverting the same to dispose said spaces to open upwardly and allow molten solder on said tubular element to run into and fill voids in said solder spaces and to form a fillet at the upper end of each said space; and setting the solder.

12. The method of soldering a tubular element to a pair of female elements of claim 11 wherein the distal end of each of said leg portions is wedged into the female element.

13. The method of soldering a tubular element to a pair of female elements of claim 11 wherein said female elements are positioned with the longitudinal axes thereof spaced apart a preselected distance corresponding to the axial spacing of said tubular element legs to receive said legs arcuately coaxially therein with said annular solder spaces extending substantially upwardly about said legs.

14. The method of soldering a tubular element to a pair of female elements of claim 11 wherein said female element comprises a tubular element having a bore provided with a distal end portion defining said solder space and a radially constricted portion at the inner end of said distal end defining a wedging portion of the female element.

15. The method of soldering a tubular element to a pair of female elements of claim 11 wherein each said female element defines a tube stop and said leg portions of the tubular element are inserted into the female element to adjacent said tube stops for facilitated assembly thereof.

16. The method of soldering a tubular element to a pair of female elements of claim 11 wherein each said female element comprises a tubular element having an expanded distal end defining said solder space.

* * * * *